(12) United States Patent
Steffenhagen et al.

(10) Patent No.: US 9,581,009 B2
(45) Date of Patent: Feb. 28, 2017

(54) COILED TUBING INJECTOR WITH LOAD SENSING TUBING GUIDE

(71) Applicant: National Oilwell Varco, L.P., Houston, TX (US)

(72) Inventors: Timothy S. Steffenhagen, Fort Worth, TX (US); William Benjamin White, Bedford, TX (US); David W. McCulloch, Arlington, TX (US)

(73) Assignee: National Oilwell Varco, L.P., Houston, TX (US)

(*) Notice: Subject to any disclaimer, the term of this patent is extended or adjusted under 35 U.S.C. 154(b) by 388 days.

(21) Appl. No.: 14/054,661

(22) Filed: Oct. 15, 2013

(65) Prior Publication Data
US 2015/0101799 A1  Apr. 16, 2015

(51) Int. Cl.
*E21B 19/22* (2006.01)
*E21B 44/04* (2006.01)
*E21B 17/20* (2006.01)
*G01L 3/16* (2006.01)

(52) U.S. Cl.
CPC .............. *E21B 44/04* (2013.01); *E21B 17/20* (2013.01); *E21B 19/22* (2013.01); *G01L 3/16* (2013.01)

(58) Field of Classification Search
CPC .......... E21B 19/22; E21B 19/08; E21B 17/20; G01L 3/16
See application file for complete search history.

(56) References Cited

U.S. PATENT DOCUMENTS 3,910,364 A * 10/1975 Baker .................. G01G 19/021
177/145
4,673,035 A * 6/1987 Gipson .................. E21B 19/22
166/77.1

(Continued)

FOREIGN PATENT DOCUMENTS

| GB | 2457585 | 8/2009 |
| WO | 2011079218 | 6/2011 |
| WO | 2014163508 | 10/2014 |

OTHER PUBLICATIONS

International Search Report and Written Opinion for corresponding PCT Application No. PCT/US2014/060736 (11 pages).

(Continued)

*Primary Examiner* — David Andrews
*Assistant Examiner* — Kristyn Hall
(74) *Attorney, Agent, or Firm* — Derek V. Forinash; Porter Hedges LLP (57) ABSTRACT

The invention pertains to methods and apparatus for monitoring loads on an arched tubing guide of a coiled tubing injector caused by tension on coiled tubing. The load is sensed by a load sensor, for example, a load cell placed in a strut that supports the arched tubing guide, or in a load pin or load cell placed within the structure arched tubing guide or the connection of the arched tubing guide to a frame for the coiled tubing injector, at a location where the load is representative of the load placed on an arched tubing guide by tension in the coiled tubing. The load sensor generates a feedback signal. The load is monitored, either by an operator or a controller, and torque applied to a reel around which the tubing is wound is adjusted to avoid, or in response to, excessive loads on the arched tubing guide.

21 Claims, 4 Drawing Sheets

(56) References Cited

U.S. PATENT DOCUMENTS

| | | | |
|---|---|---|---|
| 6,059,029 A * | 5/2000 | Goode | E21B 19/22 |
| | | | 166/77.3 |
| 6,142,406 A | 11/2000 | Newman | |
| 6,830,101 B2 * | 12/2004 | Saheta | E21B 19/22 |
| | | | 166/77.2 |
| 2002/0125014 A1 | 9/2002 | Dearing | |
| 2007/0246261 A1 | 10/2007 | Lowe | |
| 2013/0048270 A1 | 2/2013 | Havinga et al. | |

OTHER PUBLICATIONS

Drawing of a coiled tubing injector that was on sale on or before Oct. 15, 2012.

* cited by examiner

COILED TUBING INJECTOR WITH LOAD SENSING TUBING GUIDE

BACKGROUND

Coiled tubing refers to a continuously string of steel pipe that is continuously milled and coiled onto a large take-up reel for transportation and handling. Coiled tubing is used in a wide range of oilfield services and operations. It can be run into and out of a well bore at a high rate, relative to straight, jointed pipe, and, unlike wire line, it can be pushed into the well bore. With diameters from 0.75 inches to more than 4 inches, coiled tubing can possess a yield and tensile strengths from 50,000 pounds-force per square inch (PSI) to more than 120,000 PSI, and has been manufactured in lengths greater than 30,000 feet. It has been used for drilling, logging, cleanouts, fracturing, cementing, fishing, completion and production related operations.

Coiled tubing injectors are machines for running coiled tubing and, in some cases, even jointed pipe, in and out of well bores. The name "coiled tubing injector" derives from the fact that, in preexisting well bores, the tubing may need to be forced or "injected" into the well through a sliding seal to overcome the pressure of fluid within the well, until the weight of the tubing in the well exceeds the force produced by the pressure acting against the cross-sectional area of the pipe. However, once the weight of the tubing overcomes the pressure, it must be held by the injector.

There are a number of different types and configurations of coiled tubing injectors capable of handling coiled tubing used in oilfield operations. The head of a typical coiled tubing injector used today is comprised of two continuous chains, each mounted on sets of spaced-apart sprockets, so that there is an extended length of chain between the sprockets. At least one of the chains is driven by a motor—typically hydraulic, though other types of motors can be used—connected to one or more of the sprockets. The chains are arranged so that the coiled tubing entering the injector is held between the chains by grippers mounted to each of the chains. The grippers are pressed against the outer diameter of the tubing thereby generating a frictional force parallel to the axis of the tubing. The frictional force is directly related to the normal force applied by the grippers.

A reel of coiled tubing, a coiled tubing injector, a control cabin and other equipment for operating the injector are mounted on a trailer and transported to a site as a "coiled tubing unit." As coiled tubing is unspooled from the reel, or is spooled back onto the reel, it is guided into alignment with the chains of the coiled tubing injector by an arched tubing guide. When the coiled tubing injector is deployed at a well site, the arched tubing guide is connected to a frame of the coiled tubing injector so that it has a fixed relationship with the coiled tubing injector while the injector is being operated. Generally, the arched tubing guide is positioned or oriented so that the coiled tubing is threaded into the top of the head of the injector, between its rotating chains. Optionally, tubing can also be fed first into a straightener mounted to the frame, on top of the injector head. The straightener removes the bend in the tubing before it enters the injector head. (As used in this description, "coiled tubing injector" refers to the injector head alone or in combination with a frame, within which the head is placed, and/or a straightener, unless the context indicates otherwise.)

The reel must maintain tension on the coiled tubing to wind the tubing coiled on the reel and to keep it wound on the reel, as it is being unspooled or spooled. The arched tubing guide prevents the coiled tubing from kinking or otherwise being damaged by the tension the reel is applying to the tubing.

The arched tubing guide is typically attached to the frame of the coiled tubing injector in a manner that allows it to be attached or connected in different positions or orientations. For example, the best positioning or orientation may depend on the diameter of tubing being used and whether the tubing is being lowered or pushed into the well bore or pulled out of the well bore. When the pipe is coming off a reel, it has relatively more curve than when it is pulled from the well, which may affect how the arched tubing guide is fixed to the injector. Thus, although the arched tubing guide will have fixed relationship with the head of the coiled tubing injector during operation, this does not imply that the attachment of the arched tubing guide to the injector cannot allow for adjustment.

When being used, the coiled tubing injector with the arched tubing guide is positioned over the well head, high enough to accommodate one or more blow out preventers, a riser, and other equipment that might be connected to the wellhead through which the coiled tubing must pass before entering the well bore. The riser is made up from one or more sections of straight pipe that extends from the blow out preventers attached to the wellhead, and is used to accommodate elongated, rigid tools that are attached to the end of the coiled tubing before being lowered into the well bore. The coiled tubing injector is connected to the riser with a stripper, through which the coiled tubing is pushed or pulled. Because there is no derrick or platform, a mobile crane is driven to the site and is used to position and hold the injector in place. Alternatively, a temporary structure is erected above the wellhead, on which the coiled tubing injector is placed. In either case, the person operating the coiled tubing injector and the coiled tubing reel is located remotely from the coiled tubing injector, typically in a cabin on the trailer used to transport the reel and coiled tubing injector to the well site. Examples of risers, cranes, wellheads, reels, and coiled tubing units are shown in U.S. published patent application no. 20130175048, which is incorporated herein by reference for all purposes.

The injector controls the motion of the tubing while the reel provides tension in the tubing between the reel and the injector by being constantly back driven. The amount of tension imparted to the tube is determined by the amount of torque generated by the reel's drive and the radial distance of the working wrap of tubing to the reel's axis of rotation. Several thousands of pounds of tension between the reel and the injector are required to maintain a controlled wrapping of the tubing on and off the reel. With larger and stronger coiled tubing, more tension is required to control orderly spooling of the tubing on the reel and puts higher loads on all tubing handling equipment.

The correct amount reel torque for a specific situation is typically controlled by the operator. The operator's experience, intuition and visual observation of the wrapping of the tubing are the only guides for operation. This subjective method may lead to the tension rising too high and causing equipment failure, the most common of which is a collapse of the arched tubing guide. Examples of situations that can cause the tension to climb to dangerous levels are: 1) movement of the injector with the reel brake set, 2) failure to decrease the reel's torque output as the tubing is unwrapped (constant reel torque causes more tension at the base wrap compared to the top wrap), and 3) rapid deceleration of the injector when running out of hole (reel momentum can cause the tension to increase before reel slows to match injector speed).

Consequently, tubing handling components have been designed to ensure that the arched tubing guide or, if it is used, the strut that holds the tubing guide, has the lowest safety factor, meaning that as tubing tension increases the strut is the first component to fail. It fails by buckling. While no failure is desirable, such a failure is preferred to others as buckling of the strut provides visual feedback to the operator that an overload has occurred and is less likely to cause a catastrophic failure than other failure modes.

SUMMARY

The invention pertains to methods and apparatus for monitoring loads on an arched tubing guide of a coiled tubing injector caused by tension on coiled tubing. The load is sensed by a load sensor, for example, a load cell or load pin, that generates a feedback signal. The load is monitored, either by an operator or a controller, and torque applied to a reel around which the tubing is wound is adjusted to avoid, or in response to, excessive loads on the arched tubing guide. Monitoring the load on the arched tubing guide also allows an operator to control the reel to avoid or reduce stressing the wellhead or the coiled tubing equipment and causing damage. Due to the rig-up of the coiled tubing unit on a well, tubing tension between the tubing reel and the tubing injector can apply a significant bending load on the wellhead. The bending load is directly proportional to the tubing tension.

DETAILED DESCRIPTION OF EXEMPLARY EMBODIMENTS

In the following description, like numbers refer to like elements.

Figures 1, 2:
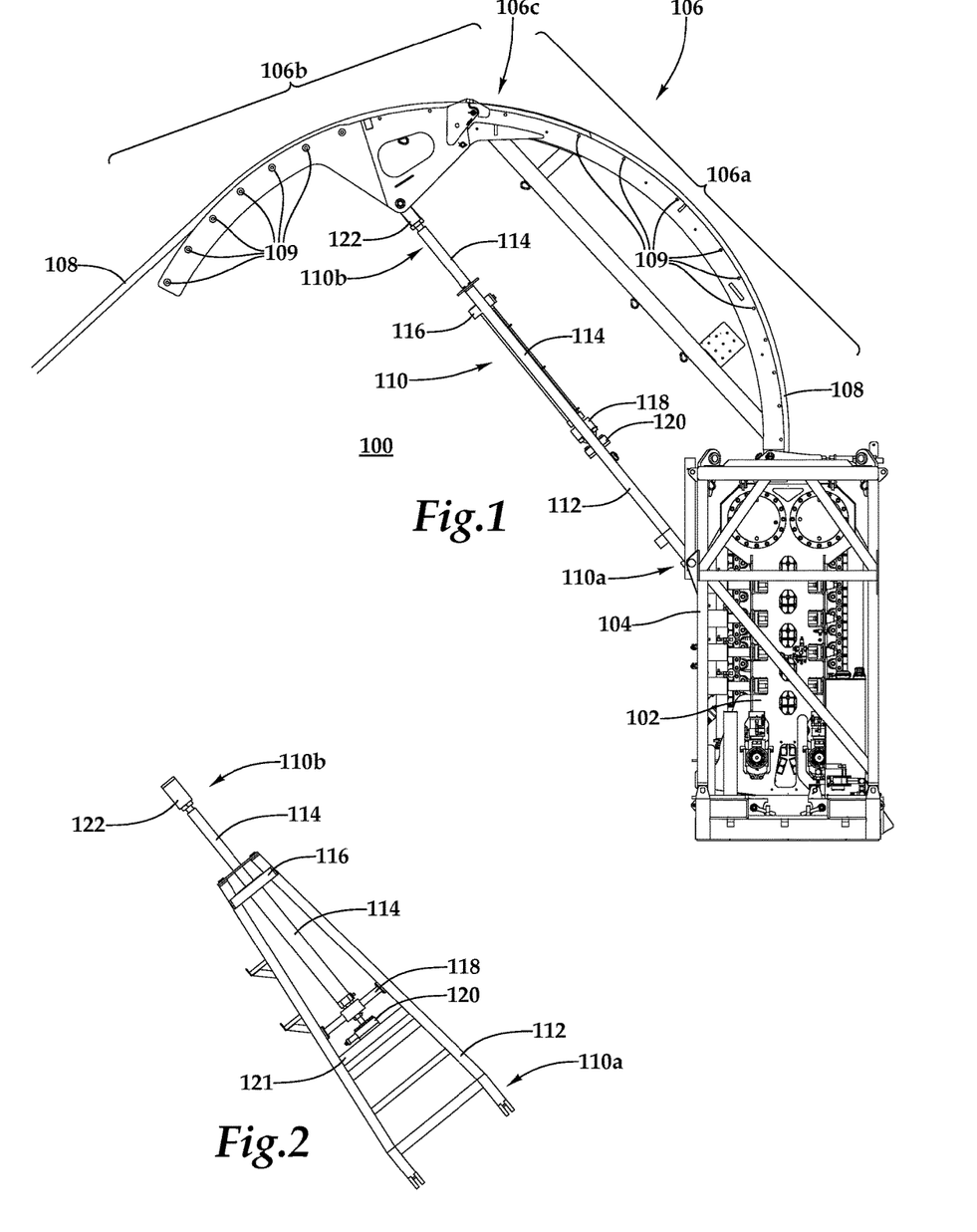
FIG. 1 is a side view of a coiled tubing injector with an arched tubing guide rigged for use at a well head.
FIG. 2 is a bottom view of a strut from the coiled tubing injector of FIG. 1.

Referring to FIG. 1 a rigged-up coiled tubing injector 100 is comprised of an injector head 102 mounted within a cage or frame 104. The frame 104 protects the injector head and allows it to be lifted by a crane or supported on a structure above the well head to accommodate riser extending from the well head. A proximal end of the arched tubing guide 106 is coupled to the top of frame 104. Its distal end is free and oriented toward a reel (not shown) on which coiled tubing 108 is wound. The arched tubing guide transitions coiled tubing 108 between the reel and the top of the injector 102. A plurality of rollers (not visible, except for the ends of pins 109 on which the rollers are mounted) are spaced along the length of the arched tubing guide The arched tubing guide transfers side loading from the tension on the coiled tubing to the frame.

In the illustrated embodiment the arched tubing guide 106 is comprised of two segments 106a and 106b so that the coiled tubing injector can be more easily transported. (An arched tubing guide can be made without foldable segments.) Segment 106a is connected to the top of frame 104. This connection could be rigid or made through a joint that allows for pivoting. Segment 106b is connected to segment 106a by a hinged joint 106c that allows segment 106b to pivot downwardly and inwardly toward the frame 104, for transport. When the coiled tubing injector is rigged, segment 106b is pivoted to operating position.

Also in the illustrated embodiment, but not necessarily in other embodiments of arched tubing guides, a strut 110 supports the arched support and transfers to frame 104 at least some of the bending moment on the arched tubing guide to frame generated by tension on the coiled tubing 108. A distal end 110b of the strut is coupled near to the distal end to arched tubing guide 106, preferably along segment 106b. A proximal end 110a of the strut is connected is coupled to frame 104. The coupling at each end of the joint is, in this example, through pivoting joints. The load on the strut 110 is primarily a compressive force. However, the coiled tubing 108 may also apply side forces to the arched tubing guide that create side bending moments on the strut where it is coupled to frame 104.

Referring to FIG. 2, one representative embodiment of strut 110 of FIG. 1 is comprised of an "A" shaped frame 112 to aid in transfer of side bending moments to frame 104. Strut 110 is further comprised of a hydraulic cylinder 114. Connected to a distal end of the hydraulic cylinder is a tang 122 that forms the distal end 110b of the strut and couples to strut 106. In this example the strut is designed to be collapsible to accommodate the folding of the arched tubing guide 106 by the pivoting of segment 106b. When segment 106b is pivoted up into an operational position, the hydraulic cylinder is pressurized to carry a compressive load. Side forces and bending moments placed on the distal end of the hydraulic cylinder are transferred to the "A" frame 112 by guides 116 and 118 through which the cylinder slides so that the load cell 120 is loaded only by compressive forces. (Guide 118 could be omitted if a load cell capable of carrying side loads is used.) The guides 116 and 118 preferably constrain hydraulic cylinder 114 only in directions perpendicular to the axis of the hydraulic cylinder, allowing the hydraulic cylinder to translate through the guide to allow for extension. The pivoting joints at each end 110a and 110b of the strut accommodate its movement.

Strut 110 is further comprised of a load cell 120. Load cell 120 is positioned between one end of the hydraulic cylinder 114 and cross member 121 to sense and measure the compressive load on the hydraulic cylinder, and thus the compressive load transferred to the frame 112 of the strut by the cross member. The compressive force or load on the strut is proportional to the bending moment on arched tubing guide 106 by tension in the coiled tubing 108 of FIG. 1. Load cell provides as an output an electrical signal representative of the load it is sensing that is transmitted to remotely located instrumentation.

Figure 3:
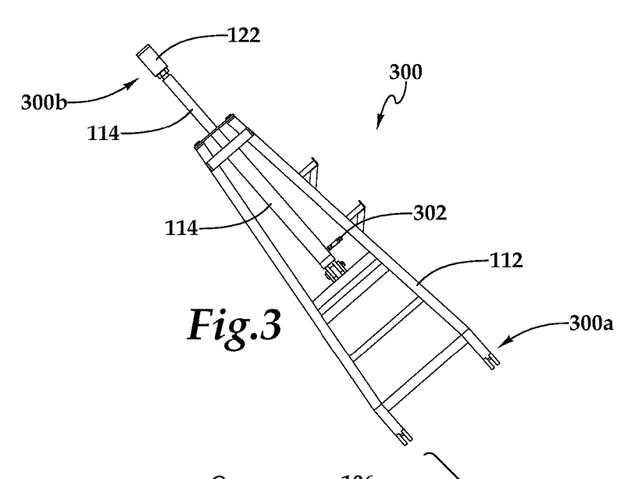
FIG. 3 is a bottom view of an alternative embodiment for the strut of FIG. 1.

Referring to FIG. 3, which illustrates an alternative embodiment of a strut 300 for use in place of strut 110 of FIG. 1. The primary difference between strut 110 (FIG. 1) and strut 300 is that strut 300 does not include load cell 120 (FIG. 1). Rather, it makes use of a hydraulic pressure sensor 302 connected to a port on hydraulic cylinder 114. The pressure sensor, like the load cell 120, generates a signal that is transmitted back to remotely located instrumentation. Furthermore, as no load cell is being used, guide 118 (see FIG. 1) is omitted. The bottom end of the hydraulic cylinder is connected to cross member 121 (FIG. 2) of frame 112 by a clevis and pin capable of carrying, unlike a unidirectional load cell, any side loads.

Figures 4, 5:
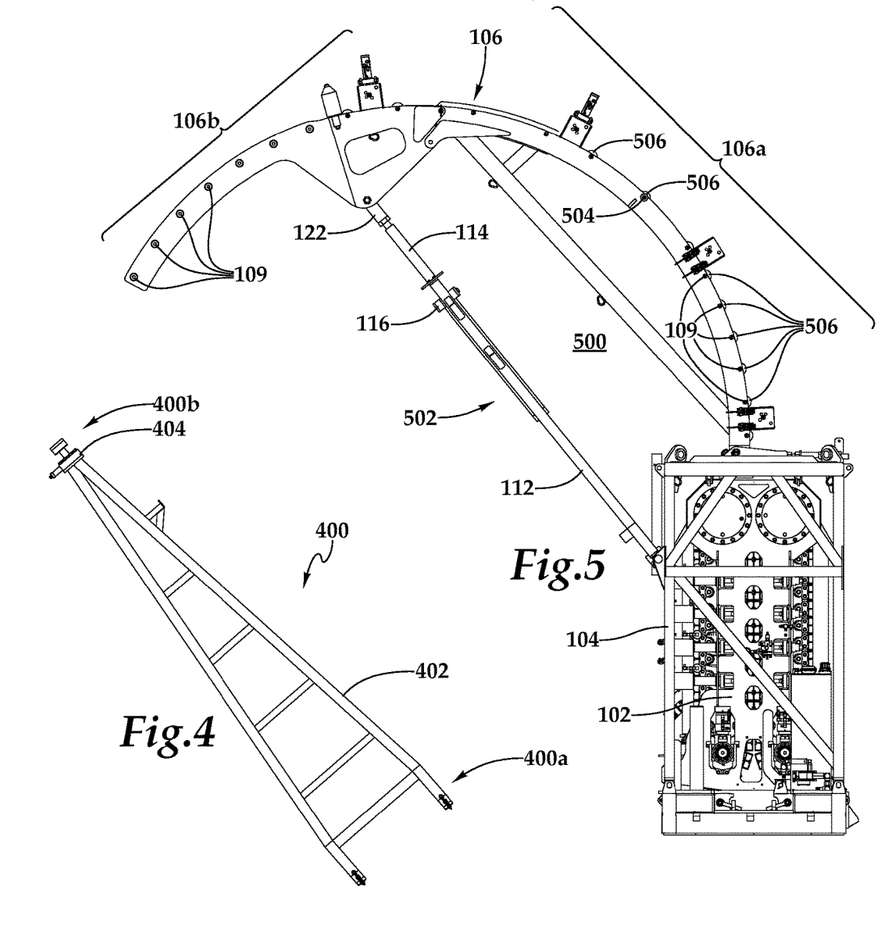
FIG. 4 is a bottom view of another alternative embodiment for the strut of FIG. 1
FIG. 5 is a side view of the coiled tubing injector of FIG. 1, with an alternative embodiment of an arched tubing guide.

FIG. 4 is an exemplary embodiment of another alternative embodiment of a strut for supporting an arched tubing guide, such as arched tubing guide 106 of FIG. 1. Strut 400 does not comprise a hydraulic cylinder and is not, at least in this embodiment, collapsible. Strut is used, for example, in place of strut 110 of FIG. 1. The arched tubing guide that it supports may be foldable, like arched tubing guide 106 (FIG. 1), or may not be foldable. Strut 400 has an "A" shaped frame 402 for transferring both compressive loads and bending moments induced by side loads on the arched tubing guide to a frame of a coiled tubing injector, such as frame 104 of the example of FIG. 1. A proximal end 400a of the strut is coupled with the frame of the coiled tubing injector; a distal end 400b is coupled near the distal end of an arched tubing guide. Load sensor 404 is placed at the distal end of the strut. The load sensor is of a type that can support side loads. The load sensor generates at least one signal indicative of the axial or compressive load on the strut. It may, optionally, also generate one or more additional signals that indicate the side load on the strut caused by side loads on the arched tubing guide.

The coiled tubing injector 500 of FIG. 5 is similar to the coiled tubing injector 100 of FIG. 1, except that strut 502 does not include a load cell for measuring the compressive load on the strut. Load pin 504 replaces at least one of the pins 109 for rollers 506. The load pin measures an perpendicular force on the roller induced by tension on coiled tubing (not shown in this FIGURE) running over the arched tubing guide and provides a signal indicating the load that is transmitted to remotely located instrumentation. The load sensed by the load pin is proportional to the amount of tension in the coiled tubing, and thus also the bending moment on the arched tubing guide and the compressive load on strut 502. More than one of the rollers 506 can be modified to incorporate a load pin.

Figures 6, 7:
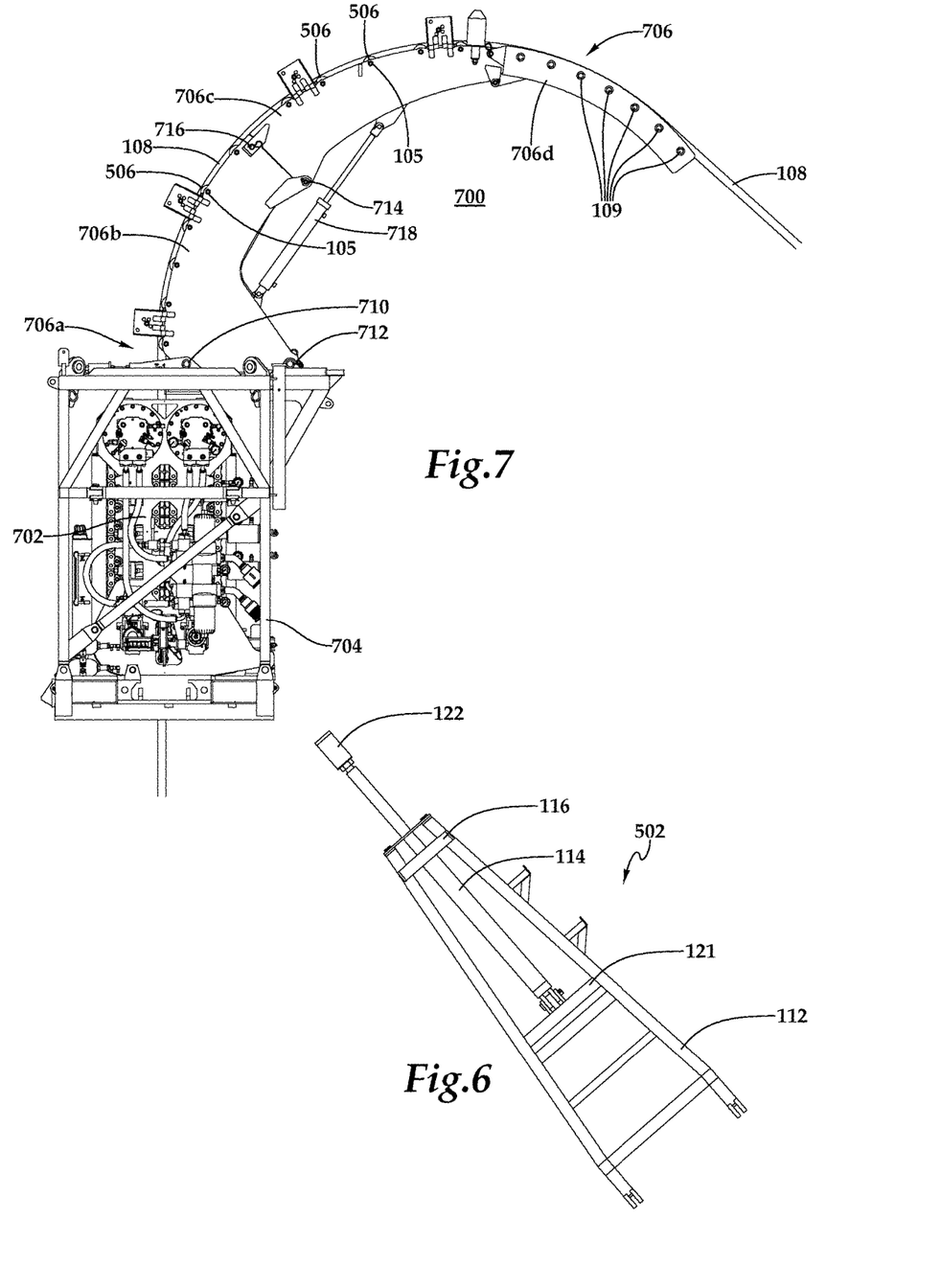
FIG. 6 is a bottom view of a strut for the arched tubing guide of FIG. 5.
FIG. 7 is a side view of the coiled tubing injector of FIGURE, with an alternative embodiment of an arched tubing guide.

Referring now to FIGS. 5 and 6, strut 502 is similar to strut 110 in the embodiment of FIG. 1. However, it omits load cell 120. Furthermore, it requires only one guide, namely guide 116. The bottom end of the hydraulic cylinder is connected to cross member 121 of frame 112 by a clevis and pin capable of carrying any side loads.

In alternate embodiments to FIGS. 1 to 6, rather than incorporating a load cell in a support strut for an arched tubing guide, a load pin is used to attach, for example, a proximal end of the strut to the frame of the coiled tubing injector. The load pin directly measures the compressive force on the strut. In still other alternate embodiments, a load pin could be incorporated into other joints at which the arched tubing guide is connected to a frame of the injector, or joints within the arched tubing guide, such as the pins used to connect segments of the arched tubing guide.

FIG. 7 illustrates one example of a coiled tubing injector 700 without a strut. The coiled tubing injector includes an injector head 702 mounted within a frame 704. A base portion 706a of the arched tubing guide 706, located at its proximal end, is coupled to the top of the frame 704 using a pinned connection. Pin 710 connects one side of the base portion, creating a joint that allows the base to pivot within a plane defined by the arched tubing guide 706. The other end of the base is pinned to the frame using a load pin 712. A force generated by bending moments on the arched tubing guide is measurable by load pin 712. The load on the load pin is proportional or related to the tension placed on coiled tubing 108. Alternately, a load cell could be used in place of the load pin to measure the bending moment placed on the arched tubing guide by tension in the cable. The load pin or load cell provides a signal that is transmitted to remotely located instrumentation, the signal representative of the load on the arched tubing guide 706.

Arched tubing guide 706 is comprised, in this example, of several segments that allow the arched tubing guide to be folded for transport. Segment 706b incorporates, in this example, the base portion 706a. Segment 706c is connected by at least to pin connections or joins 714 and 716. Removing the top pin 716 allows segment 706c to pivot down, around the pivot joint formed by pin 714. Hydraulic cylinder 718, which extends between the lower segment 706b of the arched tubing guide and segment 706c, assists with pivoting of segment 706c and may be used to transfer some of the load on the segment 706c to segment 706b. Segment 706d is connected to segment 706c of the arched tubing guide. In alternate embodiments, the arched tubing guide 706 can be comprised of more or fewer segments.

Arched tubing guide 706 incorporates rollers 506 with pins 109 as their axles. Load pins can, in alternate embodiments, replace one or more of the pins 109, which can be used in place of, or in addition to, load pin 712 to measure forces on the arched tubing guide 706 caused by tension in coiled tubing 108.

The arched tubing guides in the embodiments shown in FIGS. 1 to 6 could also be modified to have a wide base at their respective proximal ends to allow for measurement of a bending moment on the arched tubing guide. Like the embodiment of FIG. 7, the base could be joined to the top of the frame using a pin on one side of a joint that allows for pivoting of the base in the direction that arched tubing support extends (toward the reel or along the direction of the coiled tubing 108), and an example of which is pinned connection, and on the opposite side a load pin or a load cell that measures the force caused by the moment placed on the arched tubing guide as it pivots against the load pin or load cell.

In another representative embodiment of a coiled tubing injector a load cell is placed at a connection joint along the arched tubing guide. For example, the arched tubing guide is connected to a cage for the coiled tubing injector using a pin sensing a load that is proportional to the moment placed on the joint between the arched tubing guide and the cage. In another example, one or more load pins are used to connect one or more rollers.

Figure 8:
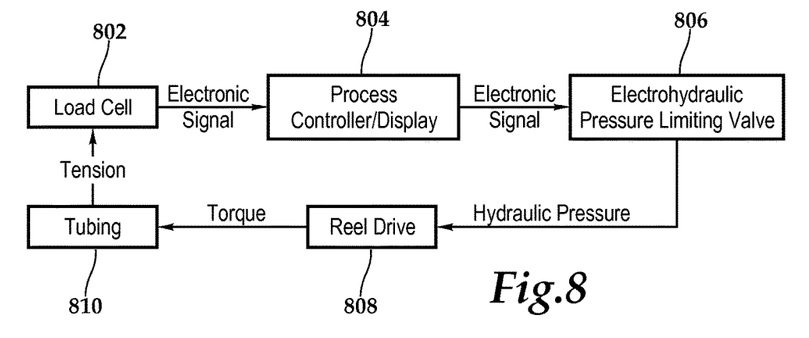
FIG. 8 is a schematic diagram representing a process and signal flows for sensing a load in an arched tubing guide of a coiled tubing injector and responding to an overload condition.

FIG. 8 schematically represents a circuit and a process of operating a coiled tubing reel. A load cell 802 provides an electric signal that is transmitted to a process controller and/or display 804. This electrical signal is amplified and transmitted by wire to the processor. It may also be transmitted wirelessly. More than one load cell can be used.

A load cell comprises a transducer that converts force into an electrical signal. A typical load cell is comprised of a structural component that is placed under load, as well as a component that measures the strain on the component. Examples of types of load cells include hydraulic, pneumatic, strain gauge, piezoelectric, and capacitive. In one embodiment, the load cell is chosen from a group consisting of these types. Load cells are typically either unidirectional, which support and sense loads along one direction or multidirectional, which support and sense loads in multiple directions. Because it will be a structural component, a load cell must be capable of carrying the same load as the structure. As an alternative to using load cells, strain gauges could be placed on members of a frame of the coiled tubing injector or an arched tubing guide, including any strut(s) that may be used. As still a further alternative, hydraulic pressure on a hydraulic cylinder carrying a load proportional to the load on the arched coiled tubing guide could also be used.

The load cell, or alternative sensor, is placed or incorporated within the structure of an arched tubing guide, or in a joint, coupling or connection between the arched tubing guide and a frame of a coiled tubing injector. The load cell or other sensor are arranged for measuring the load placed on a structural member incorporated into or associated with the arched tubing guide, the load on the structural member preferably having a known relationship with the load placed on the arched tubing guide by tension on coiled tubing running over the guide. The signal from the sensor thus represents a real-time measure of load or force on the tubing guide load. The load being measured is preferably in a direction in which the arched tubing guide is designed to fail in case of overload.

The process controller determines from the signal the load being sensed by the load cell and, in this example displays it. The display is located in a location remote from the arched tubing guide, where an operator of the reel placing tension on the coiled tubing is located, such as in the cabin of a coiled tubing unit.

Figure 9:
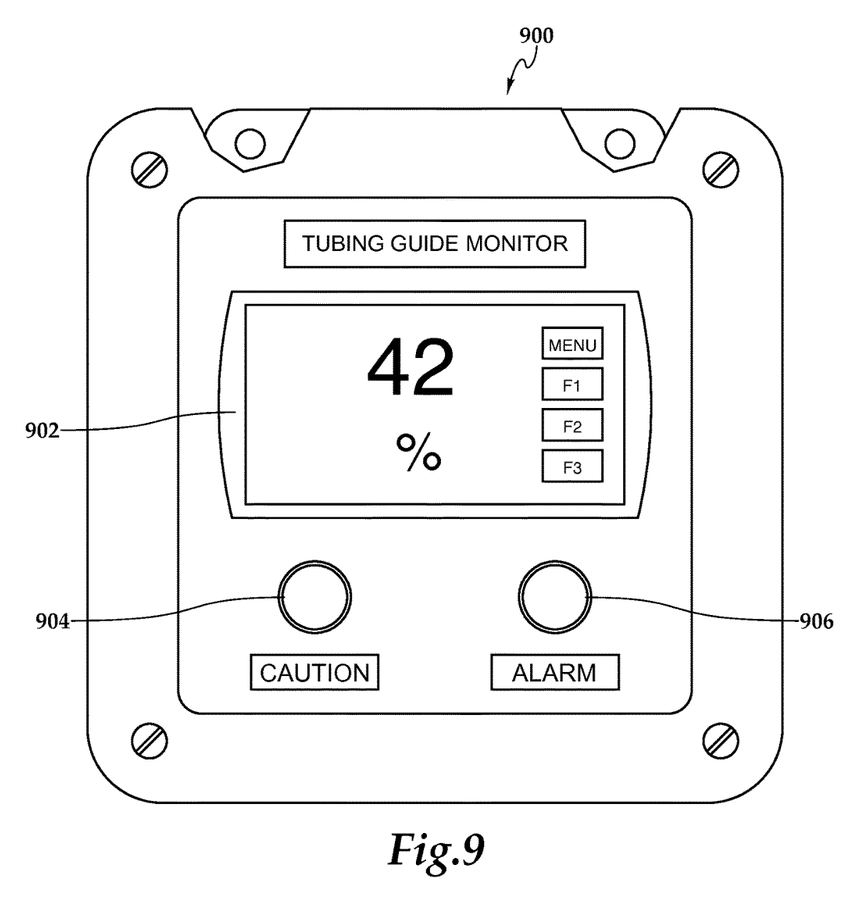
FIG. 9 is a representation of an instrument for displaying load conditions on an arched tubing guide of an coiled tubing injector.

FIG. 9 illustrates an example of display instrumentation 900. In this example, the measured load is displayed on electronic display 902, either in actual units of force or in a representation of the relationship of the measured load to one or more preset loads (for example, a percentage of a predetermined maximum load). The display may also include a caution light 904 and an alarm light 906. These visual cues or displays are controlled by the processor and triggered based on the measured load reaching or exceeding a predetermined or preset level. The caution light is illuminated first, to warn that the load is approaching an overload condition. Illumination of the alarm light indicates that the overload condition had been reached.

Alternatively, or in addition, the processor starts an audible or other type alarm. For example, the audible alarm is loud enough to be heard by the operator and others on the jobsite. This alarm could warn those throughout the jobsite of the imminent danger that the tubing guide is overloaded. The audible alarm would be, for example, set to trigger at a point above the maximum safe operating load of the tubing guide.

A person operating the reel and coiled tubing injector monitors the display and responds to it by adjusting the torque placed on the coiled tubing reel. However, in the alternative, or in addition, as show in FIG. 8, the reel on the torque on the reel is adjusted automatically, and in real time, when an overloading condition exists or is imminent, as determined by the processor. In this situation the processor 804 generates an electronic signal to, for example, an electrohydraulic pressure limiting valve 806. This valve reduces, in response to the signal, the hydraulic pressure supplied to the motor turning drive reel 808. Reduction of the hydraulic pressure supplied to the motor reduces the torque on the reel, which reduces the tension of coiled tubing 810. In an alternate embodiment, if an electric or other type of motor is used to rotate the reel, the processor generates an electronic signal to a power supply unit to reduce power supplied to the motor.

Optionally, or as an alternative, in the embodiments of a coiled tubing injector that incorporate a hydraulic cylinder to at least assist with supporting the load on an arched tubing guide, an overloading condition can be used to trigger instead a release of pressure in the hydraulic cylinder on the tubing guide strut which holds it extended causing an orderly folding of the tubing guide. For example, the amount of the load, and thus the measure force on the load cell, that would trigger the folding of the guide, is selected to be well above the rating of the tubing guide but less than a calculated or expected force at which the strut would begin to buckle. Although unexpected folding of the tubing guide would not be desirable in operation, it would be preferable to a collapse of the guide or damage to other components of the coiled tubing unit or to the wellhead. The folding could, in other embodiments, be triggered if tension remains too high after hydraulic pressure to the motor turning the reel is reduced.

Referring to FIGS. 1, 5 and 7, injectors heads 102 (FIGS. 1 and 5) and injector head 702 (FIG. 7) are intended to be representative of coiled tubing injector heads that are generally capable of running coiled tubing in and out of well bores drilled for production of oil and/or gas. The coiled tubing injector head includes, in this example, two continuous chains, each mounted on sets of spaced-apart sprockets, so that there is an extended length of chain between the sprockets. At least one of the chains is driven by a hydraulic motor that receives hydraulic fluid from a power pack (not shown) coupled through a transmission to one or more of the sprockets. The chains are arranged so that coiled tubing entering the top of the injector head is held between the chains by grippers mounted to each of the chains. The grippers are pressed against the outer diameter of the tubing thereby generating a frictional force parallel to the axis of the tubing. The frictional force is directly related to the normal force applied by the grippers.

The foregoing description is of exemplary and preferred embodiments. The invention, as defined by the appended claims, is not limited to the described embodiments. Alterations and modifications to the disclosed embodiments may be made without departing from the invention. The meaning of the terms used in this specification are, unless expressly stated otherwise, intended to have ordinary and customary meaning and are not intended to be limited to the details of the illustrated or described structures or embodiments.

What is claimed is:

1. A coiled tubing injector comprising:
   an injector head;
   a frame within which the injector head is mounted;
   an arched tubing guide having a proximal end coupled with the frame and a distal end extending outwardly from the frame;
   a strut extending between the arched tubing guide and the frame for supporting the arched tubing guide, wherein the strut comprises a strut frame having two legs and at least one cross member, and wherein the strut comprises a hydraulic cylinder having a first end coupled to the arched tubing guide and a second end coupled to the at least one cross member; and
   one or more load sensors positioned for measuring a compressive force on the strut, each of the one or more load sensors transmitting a signal indicative of the compressive force on the strut, wherein the hydraulic cylinder is constrained in the direction perpendicular to the hydraulic cylinder by at least one guide coupled to the strut frame, and wherein the hydraulic cylinder slides through the at least one guide.

2. The coiled tubing injector of claim 1, wherein at least one of the one or more load sensors is positioned within the strut between the hydraulic cylinder and the at least one cross member.

3. The coiled tubing injector of claim 1, wherein at least one of the one or more load sensors is comprised of a load cell positioned to receive the compressive force on the strut.

4. The coiled tubing injector of claim 3, wherein the load cell is positioned at one end of the hydraulic cylinder.

5. The coiled tubing injector of claim 1, wherein at least one of the one or more the load sensors comprises a load pin.

6. The coiled tubing injector of claim 5, further comprising a load pin part of a coupling of the strut to the frame.

7. The coiled tubing injector of claim 1, wherein at least one of the one or more load sensors comprises a pressure sensor for measuring the hydraulic pressure within the hydraulic cylinder.

8. The coiled tubing injector of claim 1, further comprising a load indicator positioned remotely from the coiled tubing injector responsive to a signal transmitted from at least one of the one or more the load sensors.

9. The coiled tubing injector of claim 8, wherein the load indicator comprises a visual display.

10. The coiled tubing injector of claim 8, wherein the load indicator comprises an audible alarm.

11. The coiled tubing injector of claim 8, wherein the load indicator comprises a caution light.

12. The coiled tubing injector of claim 11, wherein the load indicator further comprises an alarm light.

13. The coiled tubing injector of claim 1, further comprising a feedback control loop responsive to the compressive force on the strut.

14. The coiled tubing injector of claim 13, wherein the feedback loop is adapted for regulating operation of a reel on which coiled tubing is wound in response to the compressive force on the strut.

15. A method for operating a coiled tubing injector and a reel around which a supply of coiled tubing is wound, the method comprising:
    providing the coiled tubing injector with an arched tubing guide having a proximal end coupled with a frame within which an injector head is mounted, and a distal end extending outwardly from the frame;
    supporting the arched tubing guide with a strut extending between the arched tubing guide and the frame, wherein the strut comprises a strut frame having two legs and at least one cross member, and wherein the strut comprises a hydraulic cylinder having a first end coupled to the arched tubing guide and a second end coupled to the at least one cross member;
    pressurizing the hydraulic cylinder;
    unfolding the arched tubing guide;
    constraining the hydraulic cylinder in the direction perpendicular to the hydraulic cylinder by at least one guide coupled to the strut frame, wherein the hydraulic cylinder slides through the at least one guide;
    running coiled tubing from the reel, over the arched tubing guide, and into the injector head for insertion into a well bore;
    placing torque on the reel to tension the coiled tubing between the reel and the injector head;
    measuring a compressive force on the strut, wherein measuring the compressive force on the strut comprises measuring a compressive force on the hydraulic cylinder;
    transmitting a signal representative of the compressive force to a load indicator positioned remotely from the coiled tubing injector; and
    indicating an overload condition with the load indicator in response to the measured compressive force exceeding at least one predetermined level.

16. The method of claim 15, further comprising reducing the torque on the reel in response to the overload condition.

17. The method of claim 15, wherein the signal indicative of the measured compressive force is received by a processor and the processor determines when the signal indicates that the measured compressive force exceeds the at least one predetermined level.

18. The method of claim 15, wherein measuring the compressive force on the hydraulic cylinder is performed with a load cell positioned between the second end of the hydraulic cylinder and the at least one cross member.

19. A coiled tubing injector comprising:
    an injector head;
    a frame within which the injector head is mounted;
    an arched tubing guide having a proximal end coupled with the frame and a distal end extending outwardly from the frame;
    a strut extending between the arched tubing guide and the frame for supporting the arched tubing guide, wherein the strut comprises a strut frame having two legs and at least one cross member, wherein the strut comprises a hydraulic cylinder having a first end coupled to the arched tubing guide and a second end coupled to the at least one cross member, wherein the hydraulic cylinder is constrained in the direction perpendicular to the hydraulic cylinder by at least one guide coupled to the strut frame, and wherein the hydraulic cylinder slides through the at least one guide;
    means for measuring a compressive force on the strut; and
    means, positioned remotely from the coiled tubing injector, for indicating an overload condition in response to the measured compressive force exceeding at least one predetermined level.

20. The coiled tubing injector of claim 19, further comprising means for automatically reducing torque applied to a reel in response to the signal indicating an overload condition on the arched tubing guide.

21. The coiled tubing injector of claim 19, wherein at least one of the one or more load sensors comprises a load cell positioned between the second end of the hydraulic cylinder and the at least one cross member.

* * * * *